US009322737B2

(12) United States Patent
Holmberg et al.

(10) Patent No.: US 9,322,737 B2
(45) Date of Patent: Apr. 26, 2016

(54) METHOD OF TESTING THE INTEGRITY OF A SECOND SEAL OF AN ELECTRICAL INSULATOR

(71) Applicant: ABB Technology Ltd, Zurich (CH)

(72) Inventors: Anders Holmberg, Ojebyn (SE); Anna Brorsson, Luleå (SE); Bengt Asplund, Piteå (SE); Jonas Persson, Lulea (SE); Mattias Lundborg, Luleå (SE)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 14/478,972

(22) Filed: Sep. 5, 2014

(65) Prior Publication Data
US 2014/0373602 A1 Dec. 25, 2014

Related U.S. Application Data

(63) Continuation of application No. PCT/EP2013/053896, filed on Feb. 27, 2013.

(30) Foreign Application Priority Data

Mar. 6, 2012 (EP) ..................................... 12158157

(51) Int. Cl.
*G01M 3/32* (2006.01)
*G01M 3/18* (2006.01)
(Continued)

(52) U.S. Cl.
CPC ................ *G01M 3/183* (2013.01); *G01M 3/22* (2013.01); *G01R 31/02* (2013.01); *H01B 17/36* (2013.01); *H01B 17/14* (2013.01)

(58) Field of Classification Search
CPC ... G01M 3/2869; G01M 3/2876; G01M 3/32; G01M 3/20; G01M 3/202; H01B 17/34; H01B 17/36
See application file for complete search history.

(56) References Cited

U.S. PATENT DOCUMENTS 2,986,595 A * 5/1961 Fiero ...................... H01B 17/36
174/140 R
3,384,701 A * 5/1968 Kalb ......................... C02F 5/08
174/12 R (Continued)

FOREIGN PATENT DOCUMENTS

CN        2879154 Y     3/2007
CN     201156452 Y    11/2008
(Continued)

OTHER PUBLICATIONS

International Search Report & Written Opinion of the International Searching Authority Application No. PCT/EP2013/053896 Completed: Mar. 28, 2103 ; Mailing Date: Apr. 8, 2013 pp. 13.

*Primary Examiner* — David A Rogers
(74) *Attorney, Agent, or Firm* — Whitmyer IP Group LLC

(57) ABSTRACT

An insulator for separating two objects with different electrical potential, the insulator including an insulating body enclosing a first volume for housing a gas, the body being provided with an opening, and a sealing arrangement arranged to seal the opening in the body and including a first gas-tight sealing element for sealing the opening and provided with a first closable opening, and a second gas-tight sealing element for sealing the opening, and arranged inside the first sealing element so that the first and second sealing elements define a second volume significantly smaller than the first volume. The second sealing element is provided with a second closable opening which in cooperation with the first closable opening enable control of the gas pressure in the first volume. Methods for leakage detection of the insulator are also disclosed.

12 Claims, 4 Drawing Sheets

(51) Int. Cl.
G01M 3/22 (2006.01)
H01B 17/36 (2006.01)
G01R 31/02 (2006.01)
H01B 17/14 (2006.01)

(56) References Cited

U.S. PATENT DOCUMENTS

| | | | | |
|---|---|---|---|---|
| 4,045,604 | A | * | 8/1977 | Clabburn ..................... 428/35.1 |
| 4,090,051 | A | * | 5/1978 | Frink et al. ........................ 218/1 |
| 5,345,812 | A | * | 9/1994 | Haboian ........................... 73/46 |
| 5,755,372 | A | * | 5/1998 | Cimbura, Sr. ................ 277/318 |
| 5,977,487 | A | * | 11/1999 | Kuhl ............................. 174/176 |
| 6,017,168 | A | * | 1/2000 | Fraser et al. ................ 405/224.4 |
| 6,354,142 | B1 | * | 3/2002 | Nothhelfer et al. ............. 73/49.3 |
| 6,479,294 | B1 | * | 11/2002 | Fong et al. ......................... 436/3 |
| 2003/0037604 | A1 | * | 2/2003 | Poblete ............................. 73/73 |
| 2006/0225913 | A1 | * | 10/2006 | Hornbach et al. ......... 174/138 F |
| 2013/0248037 | A1 | * | 9/2013 | Burton et al. ................... 138/89 |

FOREIGN PATENT DOCUMENTS

| | | |
|---|---|---|
| DE | 902871 C | 1/1954 |
| DE | 3707197 A1 | 9/1988 |
| EP | 1801819 A1 | 6/2007 |
| GB | 635814 A | 4/1950 |
| JP | H09139128 A | 5/1997 |

* cited by examiner

METHOD OF TESTING THE INTEGRITY OF A SECOND SEAL OF AN ELECTRICAL INSULATOR

FIELD OF THE INVENTION

The present invention relates an insulator used for high voltage applications and more specifically a post insulator for separating two objects with different electrical potential.

BACKGROUND OF THE INVENTION

The market for high strength post insulators is dominated by porcelain because they can offer a large diameter solid core insulator at a low cost. Solid core composite insulators with large diameters are difficult to make and more expensive than porcelain. The composite insulator industry has struggled to achieve cost efficient solutions using hollow core insulators where the inside insulation is based on foam filling or high pressure gas filling.

The invention relates to such post insulators of any size used for separating two electrical potentials, normally a high electrical potential from ground. They may be used as so called station post insulators in switchgears in converter stations of plants for transmitting electric power, such as for separating valves in a converter in a station of a HVDC (High Voltage Direct Current) plant with respect to ground. Another possible use is to carry overhead electrical high voltage cables.

Post insulators can have specific lengths, i.e. heights, of 2-12 m, but any other size is possible.

The voltage, i.e. potential difference, in question may for instance be 100-1200 kV, although quite different voltages are possible. The voltage may be an alternating voltage or a direct voltage.

It is very important in a post insulator of this type to prevent short circuits between the electrical potentials separated by the insulator. The outside of the insulator is normally covered in sheds and the insulator is designed to withstand the voltage difference on the outside of the insulator. In a gas-filled composite insulator, the inside volume is normally a controlled atmosphere at the time of first use but there is a risk that over time moisture will leak into the enclosed volume of the insulator, due to leaks in the end sealing which could lead to short circuits. In high pressure gas filled applications the pressure is usually monitored and such leaks will be detected by a pressure drop.

EP 1 801 819 discloses a foam filled post insulator. The problem with foam filled post insulators is that they need to have a strong and durable interface between the tube and foam core to avoid water forming an axial conductor in the cavities of a weak interface where the foam separated from the insulator tube. CN 201 1/56452U discloses another post insulator.

JP 09139128 discloses a gas filled post insulator with airtight end sealing and electric field relaxing parts, projecting into the tube but the electric field relaxing part is arranged with holes and the insulator contains moisture absorbent parts.

GB 635,814 relates to gas-filled electric insulators and has for one of its objects to provide means whereby the insulator may be replenished with gas. A hollow electric gas filled insulator has permanently sealed in one end thereof a bush which is internally threaded for receiving a removable threaded plug. Preferably the plug is provided with a head overlying the outer face of the bush and a sealing washer is disposed between the head and the bush. The aforesaid bush and plug may be arranged to be inset from the end of the insulator so that a metal fitting to be secured to said end may extend clear of the plug. For example, the aforesaid metal fitting may comprise a cap provided with a removable cover plate so that ready access may be obtained for the removal of said plug.

SUMMARY OF THE INVENTION

According to an aspect of the present invention, there is provided a method of testing the integrity of a second seal of an electrical insulator, the insulator comprising: an insulating body enclosing a first volume for housing a gas, the body being provided with an opening, and a sealing arrangement arranged to seal said opening in the body and comprising: a first sealing element for sealing said opening and provided with a first closable opening, and a second sealing element for sealing said opening, and arranged inside the first sealing element so that the first and second sealing elements define a second volume significantly smaller than the first volume, wherein the second sealing element is provided with a second closable opening which in cooperation with the first closable opening enable control of the gas pressure in the first volume. The method comprises: filling the first volume of the insulator with a gas comprising a detectable component; closing the second closable opening; evacuating the second volume through the first closable opening; and determining that the second seal between the second sealing element and the body or the closed second closable opening is leaking if the detectable component is detected in the evacuated gas from the second volume.

According to another aspect of the present invention, there is provided an insulator for separating two objects with different electrical potential, the insulator comprising: an insulating body enclosing a first volume for housing a gas, the body being provided with an opening, and a sealing arrangement arranged to seal said opening in the body and comprising: a first gas-tight sealing element for sealing said opening and provided with a first closable opening, and a second gas-tight sealing element for sealing said opening, and arranged inside the first sealing element so that the first and second sealing elements define a second volume significantly smaller than the first volume, wherein the second sealing element is provided with a second closable opening which in cooperation with the first closable opening enable control of the gas pressure in the first volume.

The insulator may be used in accordance with an embodiment of a method of the present disclosure.

By the sealing arrangement comprising two separate sealing elements, one outer which may be load bearing and provide redundancy and one inner which may provide the primary seal and may be protected by the outer sealing element, the risk of leakage from the first volume is reduced, especially since each sealing element, when the respective closable opening is closed, is gas-tight independently of the other sealing element. By means of the formed second volume, each of the sealing elements may also be individually and independently tested for leakage. Also, the second volume is significantly smaller than the first volume, when formed in the sealing arrangement in accordance with the present invention. When the second volume is relatively small, even a small leakage can be readily detected.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

With reference to the appended drawings below follows a specific description of an embodiment of the invention cited as an example.

FIG. 4 schematically shows an embodiment of a testing arrangement for testing the sealing between the first sealing element and the body as the method in FIG. 3a.

DETAILED DESCRIPTION OF THE INVENTION

Figure 1:
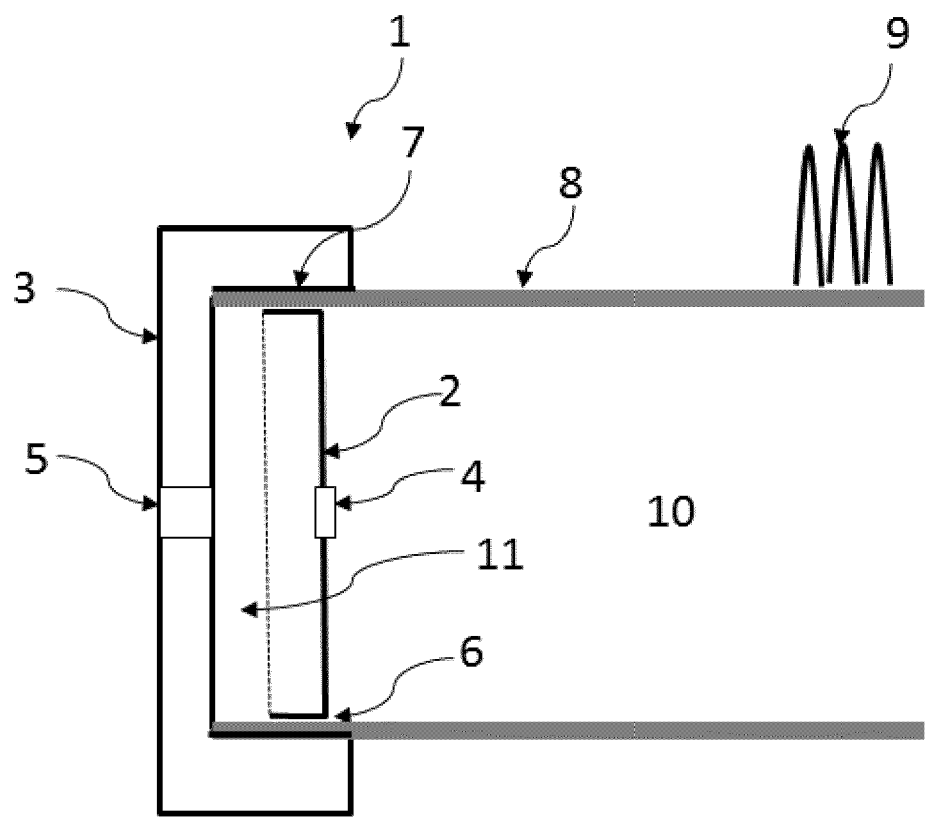
FIG. 1 schematically shows an embodiment of the sealing arrangement of the high voltage insulator according to the present invention.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The current problems for high pressure (>1.5 atm) gas filled post insulators comprise the need of gas filling at site since they cannot be factory filled due to restrictions on high pressure vessel transports. Furthermore, there is a need to monitor the gas pressure inside the insulator over time to ensure that the pressure is maintained.

A problem with gas filled post insulators in the prior art is to ensure long time gas-tightness of the end seals i.e. at the ends of the hollow composite insulators. The inventors have realised that it would be advantageous to improve the gas-tightness of the seals in order to allow a lower initial pressure of the post insulators.

According to the inventors, it is advantageous to have redundant multiple seals covering one or all opening(s) of the insulating body of a post insulator. The seals in the prior art are both supposed to be gas tight and to be load bearing, forces affecting the insulator might then be transferred to the seals and this might compromise the gas tightness of the seal.

If an opening of the insulator were to have redundant seals, then there is a problem of how to be able to test the multiple redundant seals separately in a factory after manufacture of the post insulator.

The design of a sealing arrangement, that seals an opening in the insulating body with two separate seals, a first sealing element and a second sealing element, ensures that the volume enclosed by the insulator will be gas-tight during the whole lifetime of the insulator. That the sealing elements are separate and that only the first sealing element is load bearing ensures that if the insulators are affected by forces, e.g. an earthquake, that could affect the seal created by the first sealing element and the body, the second sealing element will maintain the sealing of the whole sealing arrangement. Since the seals are so reliable there is no need to use a high pressure gas and/or pressure monitoring inside the insulator body and low or normal pressure is sufficient to ensure that moisture does not penetrate into the inside of the insulator.

The double sealing design of the sealing arrangement allows possibility to control and test each sealing individually after production to verify the integrity of all components of the sealing system. The design will allow testing of the individual seals in the production facility and will allow the insulator to be filled with a gas at low over pressure in the production facility. This will produce a product that is filled with gas and "ready to use/install" without need of filling and monitoring the gas pressure at the installation site and thus compete with ceramic insulators in ease of install and cost.

The low pressure gas filling is safer, since it does not require any special handling and transportation because the insulator is not to be considered as a filled pressure vessel that are to be transported with special care. It is more cost effective compared to foam filling. The main benefit from the customers point is that the post insulator is ready to use/install, it does not need to be gas filled at site, and because of the reliable sealing it does not require any gas surveillance or re-filling of gas.

Embodiments of the invention relate to post insulators comprising a tube of an insulating stiff material. The tube may have another cross-section than circular, such as square, although a circular cross-section is most frequent. The tube may also have a varying cross-section, such as being conical.

The insulating body in the present invention may be of a composite polymer material but the sealing arrangement in the present invention may work equally well for an insulating body made of porcelain or ceramic.

The gas inside the hollow insulator may have any pressure and the sealing arrangement in the present invention may work well for any pressure. It would be advantageous to fill the insulator at the manufacture with a gas at a pressure below 1.5 bar (absolute) since there is no particular restrictions for transporting a vessel with that low over pressure. If onsite a higher pressure is needed, gas can be added to the insulator.

In some embodiments, the method may also comprise testing the integrity of a first seal of the electrical insulator, whereby the method further comprises: placing the insulator, with the first closable opening closed, in a gas comprising a detectable component, evacuating the second volume through the first closable opening, and determining that a first seal between the first sealing element and the body or the first closable opening is leaking if the detectable component is detected in the evacuated gas from the second volume.

In some embodiments of the present invention, the insulating body is provided with a second opening with a second sealing arrangement arranged to seal said second opening in the body and comprising: a third sealing element for sealing said second opening and provided with a third closable opening, and a fourth sealing element for sealing said second opening, and arranged inside the third sealing element so that the third and fourth sealing elements define a third volume significantly smaller than the first volume.

Then, in some embodiments, the method may also comprise testing the integrity of a fourth seal of the electrical insulator, whereby the method further comprises: evacuating the third volume through the third closable opening, and determining that the fourth seal between the fourth sealing element and the body is leaking if the detectable component is detected in the evacuated gas from the third volume.

Additionally or alternatively, the method may also comprise testing the integrity of a third seal of the electrical insulator, whereby the method further comprises: placing the insulator, with the third closable opening closed, in the gas comprising the detectable component, evacuating the third volume through the third closable opening, and determining that the third seal between the first sealing element and the body or the third closable opening is leaking if the detectable component is detected in the evacuated gas from the third volume.

The testing of the first and third seals, where the gas comprising the detectable component is outside of the insulator, may be performed in parallel or essentially simultaneously. Similarly, the testing of the second and fourth seals, where the gas comprising the detectable component is in the first volume of the insulator, may be performed in parallel or essentially simultaneously. FIG. 1 shows schematically the sealing arrangement 1 of the high voltage insulator for separating two objects with different electrical potential according to the present invention. The insulator body 8 is a tube of insulating material.

The insulating body 8 encloses a first volume 10 for housing a gas, the insulating body is provided with an opening, a sealing arrangement 1 arranged to seal said opening in the body and comprising a first sealing element 3 for sealing said opening and provided with a first closable opening 5. The sealing arrangement further comprises a second sealing element 2 for sealing said opening, and arranged inside, e.g. at least partly enclosed by (e.g. enclosed on all sides except the side of the second sealing element which faces the bulk of the insulating body), the first sealing element 3 so that the first and second sealing elements define a second volume 11 between the first sealing element and the second sealing element and being significantly smaller than the first volume 10, and the second sealing element is provided with a second closable opening 4 which in cooperation with the first closable opening 5 enable control of the gas pressure in the first volume 10.

The second sealing element 2 is arranged at the end and inside the insulator body 8 close to the end of the tube or at the end of the tube. A gas-tight primary seal 6 is arrange between the second sealing element and the insulating tube 8, by gluing or by using any other suitable method known in the art to create an air tight seal between second sealing element and the insulator body 8.

A first sealing element 3 is arranged at the end of the insulator body 8. A gas-tight secondary seal 7 is arranged between the first sealing element 3 and the outside of the insulator body 8, by gluing or by any other suitable method.

The second sealing element 2 and the first sealing element 3 are arranged close to each other or even next to each other at the opening of the insulator body 8. In one embodiment the first sealing element 2 and the second sealing element 3 are glued to each other at the edge of the opening of the insulator body 8 but it is possible that the second sealing element 2 is placed inside the insulating body close to the opening but that the primary and secondary element (2, 3) do not touch each other.

The second sealing element 2 is arranged with a closable opening 4. The closable opening 4 can be a valve, threaded plug, pluggable hole, expanding plug, conical plug, rivet or any type of opening that can be closed and gas leak proof.

The first sealing element 3 is arranged with a closable opening 5. The closable opening 5 can be any type of opening that can be closed and be gas tight, such as, a valve, a threaded plug or pluggable hole.

The first sealing element 3 is made from metal. The first sealing element is preferably made from cast metal, preferably cast iron, steel, stainless steel or aluminium. The first sealing element is often formed as a flange for fixating the objects that are to be separated by the insulator.

A secondary seal 7 of the sealing arrangement is achieved by applying a sealant between the outside of the insulation body and the first sealing element 3. The sealant can be any type but preferred is a butyl rubber or an epoxy based sealant.

The second sealing element 2 can be made from a material with good gas sealing and diffusion properties such as metal but any material with good gas sealing properties is possible, for example, a sheet of polymer with an aluminized surface, or such.

The second sealing element 2 is preferably made from sheet metal which has much better gas diffusion properties than cast metal sealing. The sheet metal second sealing element is thin, with a preferable thickness of the sheet of 0.5 mm-4 mm. The preferred material of sheet metal second sealing element is stainless steel or aluminium.

A primary seal 6 of the sealing arrangement is achieved by applying a sealant between the second sealing element 2 and the inside of the insulation body. The sealant can be any type but preferred is a butyl rubber or an epoxy based sealant.

The insulation body 8 can be made from any insulating material such as ceramic, porcelain, plastic but in a preferred embodiment the insulating body is made from polymer composite with fiber such as glass fiber.

Figure 2:
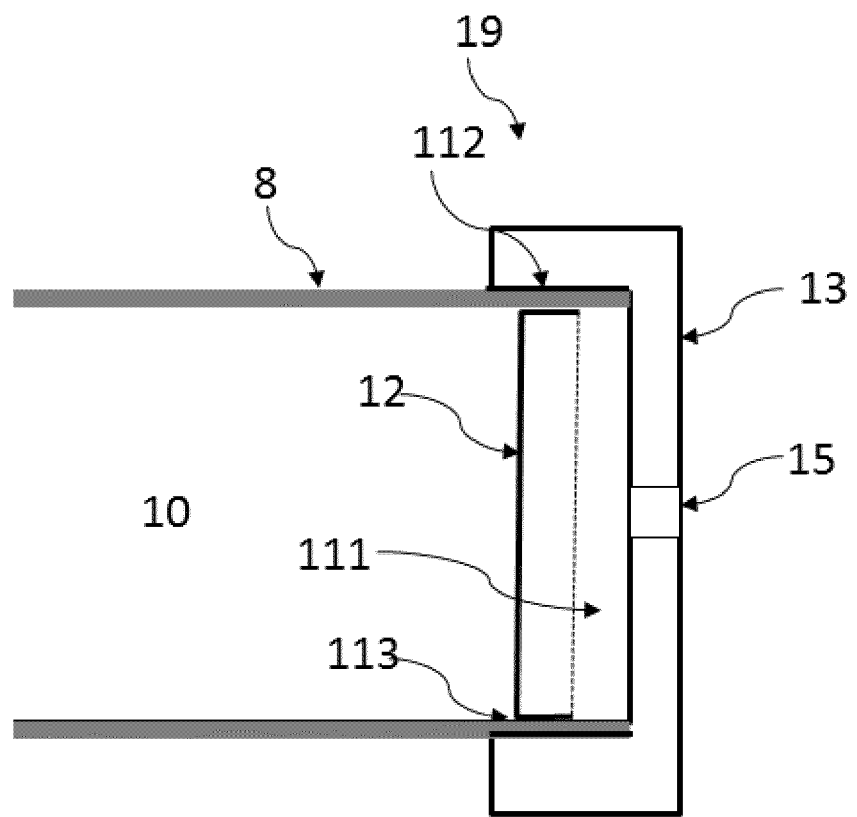
FIG. 2 schematically shows an embodiment of a second sealing arrangement of the high voltage insulator according to the present invention.

FIG. 2 shows another embodiment of a second sealing arrangement 19 of the high voltage insulator according to the present invention. The second sealing arrangement 19 is preferably to be used at opposite end of the insulating body 8 with the sealing arrangement 1.

The insulating body 8 is provided with a second opening with a second sealing arrangement 19 arranged to seal said second opening in the body and comprising a third sealing element 13 for sealing said second opening and provided with a third closable opening 15, and said second sealing arrangement 19 further comprises, a fourth sealing element 12 for sealing said second opening, and arranged inside the third sealing element 13 so that third and fourth sealing element define a third volume 111 significantly smaller than the first volume 10.

The third sealing element 13 is made from metal, preferable a cast metal, such as cast iron, steel, stainless steel or aluminium. The third sealing element is often formed as a flange or similar, for fixating the objects that are to be separated by the insulator.

The fourth sealing element 12 can be made from a material with good gas sealing and diffusion properties such as metal but any material with good gas sealing properties is possible, for example, a sheet of polymer with an aluminized surface, or such.

The fourth sealing element 12 is preferably made from sheet metal which has much better gas diffusion properties than cast metal sealing. The sheet metal fourth sealing element is thin, with a preferable thickness of the sheet of 0.5 mm-4 mm. The preferred material of sheet metal fourth sealing element 12 is stainless steel or aluminium.

The present invention allows for a two-step, routine production tests of the individual seals 6, 7 in the factory.

Figure 3A:
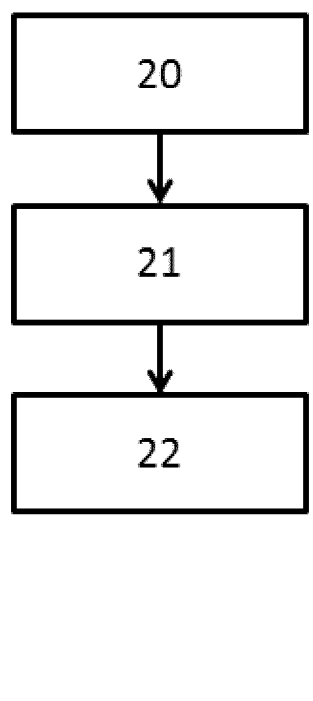
FIGS. 3A and 3B schematically show embodiments of a method of testing the secondary seal, between the first sealing element and the body and the primary seal, between the second sealing element and the body, respectively.

FIG. 3a describes the method of testing the secondary seal 7. In first step 20, a vacuum pump 30 or similar is attached 32 to the first closable opening 5 in the first sealing element 3. The pump 30 is evacuating the air out of the insulator, thus creating a low pressure or vacuum inside the insulator. This can be done with the second closable opening 4 open or closed. Depending on if the second closable opening 4 open or closed, slightly different leakage paths are tested.

In a second step 21, the insulator is placed in environment with a gas at around or above normal pressure, with a detectable trace gas. Means for detecting the trace gas is arranged in the gas leaving the first closable opening 5 e.g. in the exhaust of the vacuum pump.

In a final step 22, a fault in the secondary seal 7 is determined if the detectable trace gas is detected in the gas from the opening 5.

Figure 3B:
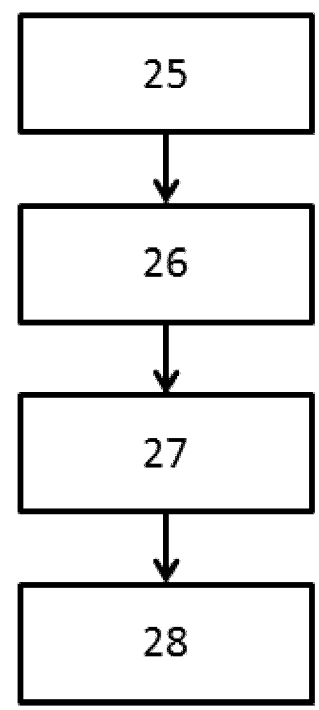

FIG. 3b describes the method of testing the primary seal 6.

In first step 25, the first volume of the insulator is emptied and then filled with a gas that includes a detectable trace gas, with a pressure around or above normal pressure.

In a second step 26, the second closable opening 4 is closed.

In a third step 27, a vacuum pump 30 or similar is attached 32 to the first closable opening 5 in the first sealing element 3. The pump 30 is evacuating the air out of the second volume 11 in the insulator, thus creating a low pressure or vacuum inside the second volume in the insulator. The same testing principle is obtained by placing the whole insulator in a vacuum chamber.

In a final step 28, a fault in the primary seal 6 or in the closed second closable opening 4 is determined if the detectable trace gas is detected in the gas leaving the first closable opening 5 e.g. in the exhaust of the vacuum pump.

The method of testing described in FIG. 3a, 3b can also be used on the second sealing arrangement 19.

Figure 4:
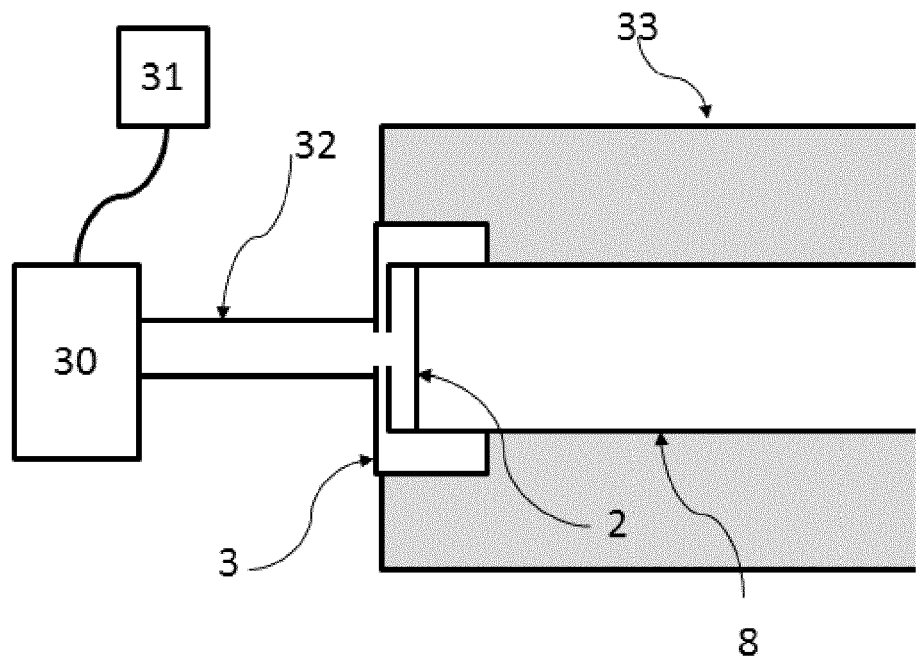

FIG. 4 shows the testing arrangement used by the method of testing the secondary seal 7 described in FIG. 3a.

A vacuum pump 30 or similar is attached 32 to the first closable opening 5 in the first sealing element 3. The pump 30 is evacuating the gas out of the insulator, thus creating a low pressure or vacuum inside the insulator.

This evacuating the gas out of the insulator can be done in two test steps; one where the second closable opening 4 is closed and one the second closable opening 4 is open. Each test step tests slightly different gas leakage path.

The insulator is then placed in environment with a gas around normal pressure or above, with a detectable trace gas. Means for detecting 31 (e.g., detector) the trace gas is arranged in the exhaust of the vacuum pump or in another suitable location. If the trace gas is detected in the gas leaving the closable opening 5, the tightness of the sealing element 3 or the secondary seal 7, between the first sealing element 3 and the body 8 is compromised.

The second sealing arrangement 19 can be tested in the same way by attaching a vacuum pump or similar to the third closable opening 15 and if one is detecting the detectable trace gas leaving the third closable opening 15, the seal between the body 8 and the fourth sealing element 12 is compromised.

The detectable trace gas can be helium but any type of detectable gas can be used. The environment with a detectable trace gas might also comprise only or almost only detectable gas.

Figure 5:
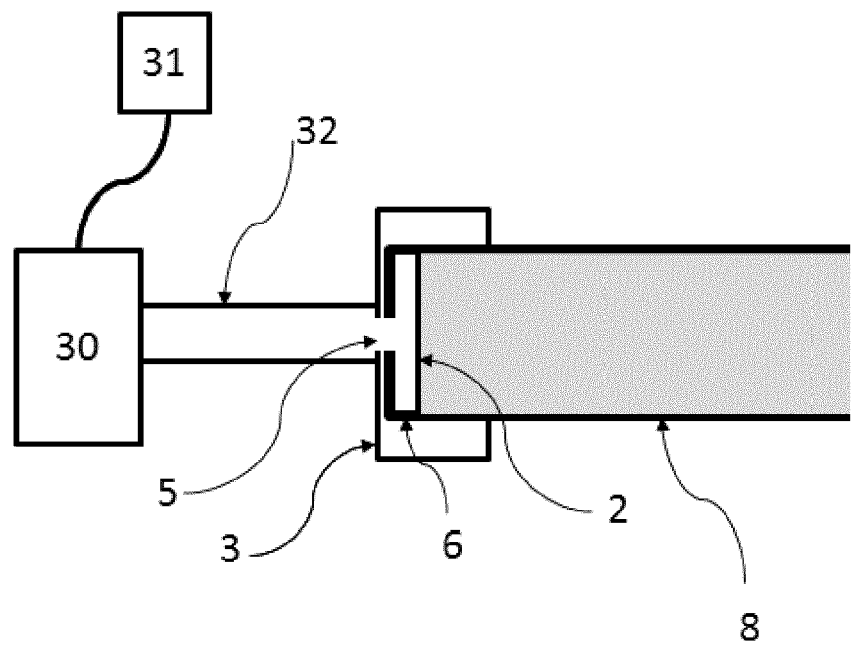
FIG. 5 schematically shows an embodiment of a testing arrangement for testing the sealing between the second sealing element and the body as the method in FIG. 3b.

FIG. 5 shows the testing arrangement used by the method testing the primary seal 6 described in FIG. 3b.

The first volume 10 is filled with a gas around normal pressure or above, with a detectable trace gas.

A vacuum pump 30 or similar is attached 32 to the closable opening 5 in the first sealing element 3. The pump 30 is evacuating the air out of the second volume 11, thus creating a low pressure or vacuum inside the second volume 11.

Means for detecting 31 (e.g., detector) the trace gas is arranged in the exhaust of the vacuum pump or in another suitable location. If the trace gas is detected in the gas leaving the closable opening 5, the primary seal 6, between the second sealing element 2 and the body 8 is compromised.

The second sealing arrangement 19 can be tested in the same way by attaching a vacuum pump or similar to the third closable opening 15 and if one is detecting the detectable trace gas leaving the third closable opening 15, the seal between the body 8 and the fourth sealing element 12 is compromised.

Below follow descriptions of some other aspects and embodiments of the present disclosure.

According to an aspect of the present invention, there is provided an insulator for separating two objects with different electrical potential, the insulator comprises an insulating body enclosing a first volume for housing a gas, the body being provided with an opening, a sealing arrangement arranged to seal said opening in the body and comprising, a first sealing element for sealing said opening and provided with a first closable opening. The sealing arrangement further comprises, a second sealing element for sealing said opening, and arranged inside the first sealing element so that first and second sealing element define a second volume significantly smaller than the first volume, the second sealing element is provided with a second closable opening which in cooperation with the first closable opening enable control of the gas pressure in the first volume. In some embodiments the first sealing element 3 may only have an active sealing function in case of leakage through the second sealing element 2, thus providing a redundant sealing solution. In some embodiments, the first sealing element is load bearing, i.e. the insulator is attached to another object via the first sealing element, while the second, inner, sealing element is not load bearing.

In another embodiment of the invention, an insulator where the insulating body is provided with a second opening with a second sealing arrangement arranged to seal said second opening in the body and comprising a third sealing element for sealing said second opening and provided with a third closable opening, and said second sealing arrangement further comprises a fourth sealing element for sealing said second opening, and arranged inside the third sealing element so that third and fourth sealing element define a third volume significantly smaller than the first volume. The third sealing element 13 will only have an active sealing function in case of leakage through the fourth sealing element 12, thus providing a redundant sealing solution.

In another embodiment of the invention, the first sealing element 3 is arranged substantially outside of the insulating body.

In another embodiment of the invention, the third sealing element 13 is arranged substantially outside of the insulating body.

In another embodiment of the invention, the first sealing element 3 is load carrying and the second sealing element 2 is not part of the load carrying structure.

In another embodiment of the invention, the third sealing element 13 is load carrying and the fourth sealing element 12 is not part of the load carrying structure.

In another embodiment of the invention, the second sealing element 2 is arranged at the opening and inside the insulating body 8.

In another embodiment of the invention, the fourth sealing element 12 is arranged at the opening and inside the insulating body 8.

The shape of the second sealing element 2 and the fourth sealing element 12 is preferably pan or cap shaped in that the central portion of the element extends in a direction perpendicular to the longitudinal axis of the insulating body and at the edges, the element extends in a direction parallel to the longitudinal axis of the insulating body. When the element is placed or pressed in the insulating body the surface between the edges of the element and the inside of the insulating body create a contact surface that together with a sealant create the primary seal 6.

In another embodiment of the invention, the first volume 10 in the insulator is filled with an insulating gas at a pressure below 1.5 bar (absolute). The insulator can be filled with gas at any pressure but with a pressure below 1.5 bar the insulator can be filled in the factory and transported without any special arrangements that come from restrictions in transporting pressurized vessels.

In another embodiment of the invention, the insulating body 8 comprises an elongated body. The insulating body may have circular and varying cross-section, such as being conical or have constant cross-section, such as being tubular.

In another embodiment of the invention, the outside of the insulating body 8 is surrounded by sheds 9 in an insulating material. The sheds 9 increase the creepage distance on the outside of the insulator.

The present invention also enables a method of testing the integrity of the seals in the sealing arrangement in an insulator. The method comprises the steps of
placing the insulator in a gas with detectable component 33,
evacuating the second volume 11 thought the first closable opening 5,
determining that the secondary seal 7 between the first sealing element 3 and the body 8 is leaking if one can detect the detectable component in the evacuated gas from the second volume 11.

Another method of testing a seal in the sealing arrangement comprises the step of
filling the first volume 10 of the insulator with a gas with a detectable component,
closing the second closable opening 4,
evacuating the second volume 11 thought the first closable opening 5,
determining that the primary seal 6 between the second sealing element 2 and the body 8 and the closed second closable opening 4 is leaking if one can detect the detectable component in the evacuated gas from the second volume 11.

According to another aspect of the present invention, there is provided a use of an electrical insulator for testing the integrity of a seal thereof, the insulator comprising: an insulating body (8) enclosing a first volume (10) for housing a gas, the body being provided with an opening, and a sealing arrangement (1) arranged to seal said opening in the body and comprising: a first sealing element (3) for sealing said opening and provided with a first closable opening (5), and a second sealing element (2) for sealing said opening, and arranged inside the first sealing element (3) so that the first and second sealing elements define a second volume (11) significantly smaller than the first volume (10), wherein the second sealing element is provided with a second closable opening (4) which in cooperation with the first closable opening (5) enable control of the gas pressure in the first volume (10). The use comprises: placing the insulator, with the first closable opening (5) closed, in a gas comprising a detectable component (33), evacuating the second volume (11) thought the first closable opening (5), and determining that a first seal (7) between the first sealing element (3) and the body (8) or the first closable opening (5) is leaking if the detectable component is detected in the evacuated gas from the second volume (11).

According to another aspect of the present invention, there is provided a use of an electrical insulator for testing the integrity of a seal thereof, the insulator comprising: an insulating body (8) enclosing a first volume (10) for housing a gas, the body being provided with an opening, and a sealing arrangement (1) arranged to seal said opening in the body and comprising: a first sealing element (3) for sealing said opening and provided with a first closable opening (5), and a second sealing element (2) for sealing said opening, and arranged inside the first sealing element (3) so that the first and second sealing elements define a second volume (11) significantly smaller than the first volume (10), wherein the second sealing element is provided with a second closable opening (4) which in cooperation with the first closable opening (5) enable control of the gas pressure in the first volume (10). The use comprises filling the first volume (10) of the insulator with a gas comprising a detectable component, closing the second closable opening (4), evacuating the second volume (11) through the first closable opening (5), and determining that a second seal (6) between the second sealing element (2) and the body (8) or the closed second closable opening (4) is leaking if the detectable component is detected in the evacuated gas from the second volume (11).

The present disclosure has mainly been described above with reference to a few embodiments. However, as is readily appreciated by a person skilled in the art, other embodiments than the ones disclosed above are equally possible within the scope of the present disclosure, as defined by the appended patent claims.

What is claimed is:

1. A method of manufacturing a post insulator, comprising:
providing an insulating body having a first volume for housing a gas, the body being provided with an opening,
providing a sealing arrangement arranged to seal said opening in the body and comprising:
a first sealing element for sealing said opening and provided with a first closable opening, and
a second sealing element for sealing said opening, and arranged inside the first sealing element so that the first and second sealing elements define a second volume smaller than the first volume,
wherein the second sealing element is provided with a second closable opening which in cooperation with the first closable opening enable control of the gas pressure in the first volume,
filling the first volume of the insulator with a gas comprising a detectable component,
closing the second closable opening,
evacuating the second volume through the first closable opening,
determining that a second seal between the second sealing element and the body or the closed second closable opening is not leaking if the detectable component is not detected by a detector in the evacuated gas from the second volume, and
transporting the post insulator to a site for use.

2. The method of claim 1, wherein the insulating body is provided with a second opening with a second sealing arrangement arranged to seal said second opening in the body and comprising:
a third sealing element for sealing said second opening and provided with a third closable opening, and a fourth sealing element for sealing said second opening, and arranged inside the third sealing element so that the third and fourth sealing elements define a third volume smaller than the first volume;

the method further comprising:

evacuating the third volume through the third closable opening, and determining that the fourth seal between the fourth sealing element and the body is not leaking if the detectable component is not detected by a detector in the evacuated gas from the third volume.

3. The method of claim 2, wherein testing of an integrity of the fourth seal is performed in parallel with testing of an integrity of the second seal.

4. The method of claim 1, further comprising:

placing the insulator, with the first closable opening closed, in a gas comprising a detectable component, evacuating the second volume through the first closable opening, and determining that a first seal between the first sealing element and the body or the first closable opening is not leaking if the detectable component is not detected by a detector in the evacuated gas from the second volume.

5. The method of claim 4, wherein the insulating body is provided with a second opening with a second sealing arrangement arranged to seal said second opening in the body and comprising:

a third sealing element for sealing said second opening and provided with a third closable opening, and a fourth sealing element for sealing said second opening, and arranged inside the third sealing element so that the third and fourth sealing elements define a third volume smaller than the first volume;

the method further comprising:

placing the insulator, with the third closable opening closed, in the gas comprising the detectable component, evacuating the third volume through the third closable opening, and determining that the third seal between the first sealing element and the body or the third closable opening is not leaking if the detectable component is not detected by a detector in the evacuated gas from the third volume.

6. The method of claim 5, wherein testing of an integrity of the third seal is performed in parallel with testing of an integrity of the first seal.

7. The method of claim 1, wherein the first sealing element is arranged outside of the insulating body.

8. The method of claim 1, wherein the first sealing element is load carrying, and the second sealing element is not load carrying.

9. The method of claim 1, wherein the second sealing element is arranged at the opening and inside the body.

10. The method of claim 1, wherein the first volume in the insulator is factory filled with an insulating gas at a pressure above 1 bar and below 1.5 bar.

11. The method of claim 1, wherein the insulating body comprises an elongated body.

12. The method of claim 1, wherein the outside of the insulating body is surrounded by sheds of an insulating material.

* * * * *